Patented Jan. 10, 1939

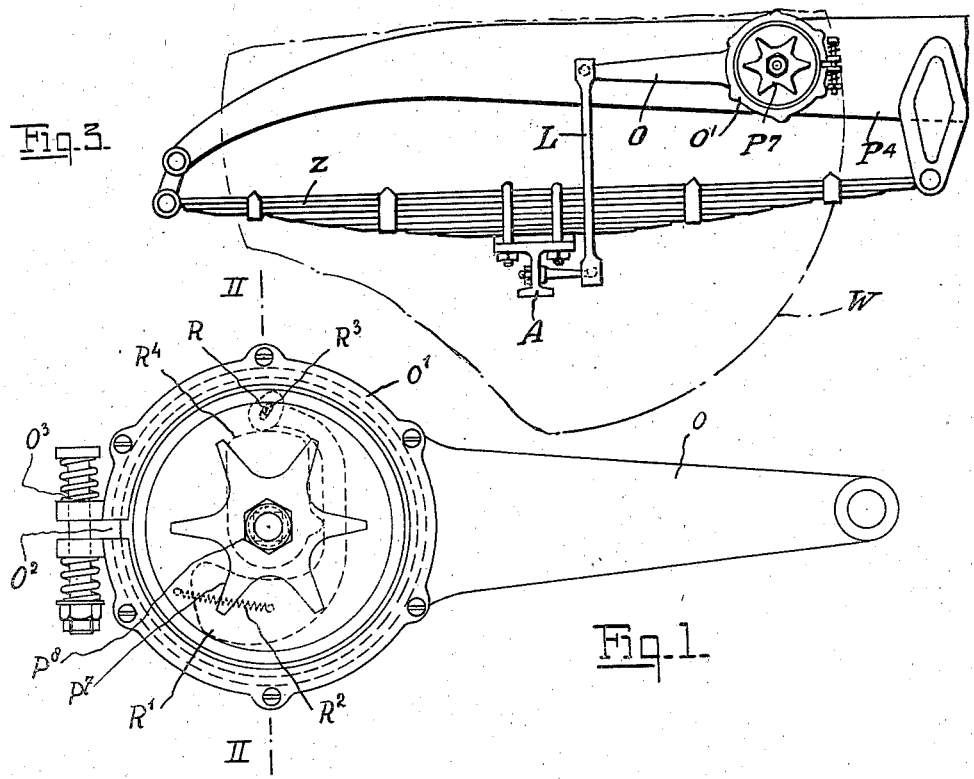
Fig. 3.
Fig. 1.
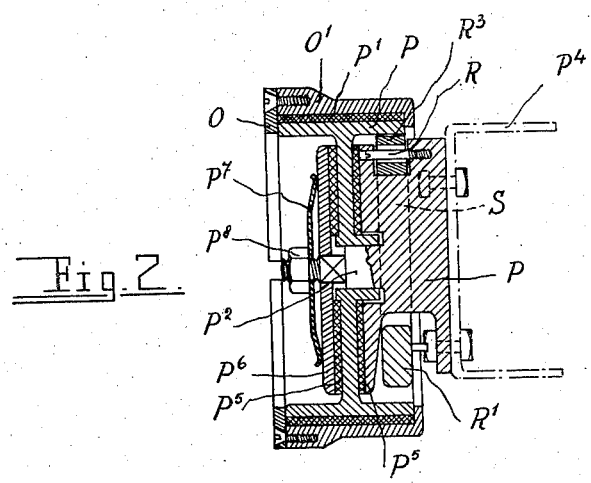
Fig. 2.

2,143,199

UNITED STATES PATENT OFFICE 2,143,199

SHOCK DAMPER

Ivan Alexander Leslie, Derby, England, assignor to Rolls-Royce Limited, Derby, England Original application August 7, 1936, Serial No. 94,815. Divided and this application May 10, 1937, Serial No. 141,673. In Great Britain August 12, 1935

3 Claims. (Cl. 188—130)

This invention relates to improvements in frictional shock dampers for vehicles and in particular for automobiles, and is a division of Serial No. 94,815, filed Aug. 7, 1936.

When an automobile is suddenly braked various disadvantages may occur. The first is the phenomenon known as "front wheel tramp" in which a see-sawing movement of the front wheels takes place about the centre of the axle. The second phenomenon is that known as "front wheel patter", the wheels bouncing along on the ground. The third phenomenon is that the application of the brakes to the wheels causes the body, which is situated above the wheels and connected to the axles by springs, to attempt to move forward with reference to the chassis owing to the momentum with which it is charged, and this results in more weight being thrown on to the front wheels and the front of the car dipping, producing an uncomfortable sensation to the passengers in the car, especially those occupying the rear seats. The reverse of this last mentioned phenomenon may be experienced when the clutch is engaged too suddenly and the wheels jerked forward.

It is known that the effect of these phenomena may be largely reduced if the shock dampers, and particularly the front shock dampers are momentarily stiffened.

Thus to prevent the car dipping on sudden braking it is desirable to stiffen the dampers and particularly the front dampers on bump movement, although they may be left unstiffened on rebound movement. To prevent discomfort to the passengers in the rear of the car, it may also be desirable to stiffen the rear bumpers on rebound. To overcome the reverse phenomenon, namely, the rearward pitching of the car on sudden acceleration caused by engaging the clutch too suddenly, it will be desirable to stiffen the front dampers on the rebound movement and the rear dampers on the bump movement.

This invention is for a new way of employing a weighted mass displaced through its own inertia to cause stiffening of a frictional shock damper.

According to this invention I provide a frictional shock damper, the resistance of which is automatically increased on a sudden change of vehicle momentum by a weighted mass displaced through its own inertia in a direction corresponding to the direction of travel of the vehicle, when such change of momentum takes place.

The weighted mass may be arranged to be displaced on sudden acceleration of the vehicle or on sudden deceleration of the vehicle in accordance with which disadvantage it is desired to meet. The weighted mass may conveniently be formed as a pendulum to swing about a horizontal pivot and means may be incorporated to prevent the weighted mass acting unless the change of momentum is sudden.

In using the expression "in a direction corresponding to the direction of travel of the vehicle" I mean that the weighted mass will be moved forward with reference to the direction of travel of the vehicle, if caused to operate on sudden deceleration and rearwardly, that is in a direction reverse to that of the travel of the vehicle, if set to operate on sudden acceleration, but for convenience throughout this specification I use the phrase "corresponding to the direction of travel of the vehicle" to include either of these directions.

In speaking throughout this specification of a "shock damper" I mean an apparatus by which the movement of a spring, by which the wheel is resiliently mounted on a chassis frame, is resisted.

I mean by "bump movement" movement of the wheel towards the chassis frame and the consequential movement of the shock damper parts, and by "rebound movement" movement of the wheel away from the chassis frame and the consequential movement of the shock damper parts.

A frictional shock damper may include two sets of friction surfaces, one offering less resistance than the other to relative movement of the shock damper parts, and the weighted mass may operate, when suddenly displaced, to prevent movement between the surfaces offering less resistance and to bring the surfaces offering greater resistance into operation. For this purpose the weighted mass may operate a cam member to cause the same to be jammed between two surfaces, each of which is rigid with one of the friction surfaces, which offer less resistance.

An example of this invention is illustrated diagrammatically in the accompanying drawing, in which Figure 1 is an elevation and Figure 2 a section on the line II—II of Figure 1.

Fig. 3 is an elevation, drawn to a smaller scale, of one end of the car frame, showing a wheel and a shock damper mounted on the frame.

Referring to the drawing, W is one of the wheels of the vehicle, A is the wheel axle, P⁴ is the vehicle frame, Z is the leaf spring connecting these parts, O is an arm or lever which is connected at one end, by means of a link L and the spring Z to the wheel axle and at its other end to a drum member O¹. This drum member is divided as shown at O², the divided parts being urged together by a bolt and spring arrangement O³. The drum member O¹ embraces an interior drum member P with cylindrical friction surfaces P¹ arranged between the two. These friction surfaces are heavily loaded by means of the spring member O³. The drum member P is freely mounted at its inner end on a boss P² rigid with a member P³ bolted to the chassis frame shown at P⁴. Friction surfaces P⁵ are arranged between this drum member P and member P³ on the one hand and a washer P⁶ carried on the end of boss P² on the other. This washer is urged inward by a star-shaped spring member P⁷ and a nut P⁸, which load the friction surfaces P⁵, but to a less extent than the friction surfaces P¹, that is to say, that the resistance to turning between the drums O¹ and P is much greater than the resistance to turning between the drum P and the member P³.

Mounted on a pin R is a pendulum member R¹ normally held in the position shown in Figure 1 by a light spring R². The end of the pendulum R¹, by which it is fulcrumed, is formed as a cam-shaped boss R³ with an internal clearance, as shown above and below the pin R. This boss lies between a cam surface R⁴ formed on member P³ and the underside of drum member P. Normally on movement of arm O drum members O¹ and P will move as a unit, the damping being provided by the lightly loaded friction surfaces on P⁵. On a sudden braking movement the pendulum R¹ will swing to the right as viewed in Figure 1. This will displace the boss R³ around pin R and grip the drum P to member P³. Movement between the chassis frame and the arm O will thereafter be resisted by the heavily loaded friction surface P¹ instead of the lightly loaded surfaces P⁵.

Actually it will be seen that the shape of the boss R³, which has an action somewhat corresponding to a jamming roller free-wheel device, will bring it about that there will be greater frictional resistance to upward movement of arm O than to downward movement, since on such upward movement this boss tends to be displaced to jam the members carrying the lightly loaded friction surfaces P⁵ and thus to bring into play the friction surfaces P¹. This effect is independent of the fact that the pendulum is also connected to the said boss to cause increased damping on sudden deceleration.

I wish it to be understood that I do not desire to be limited to the exact details of construction shown and described for obvious modifications will occur to a person skilled in the art.

I claim:

1. A frictional shock damper for spring-supported vehicle frames comprising in combination, an axle, a wheel on said axle, a frame supported by said axle and a spring inserted between said frame and axle, a member connected to said axle and a member connected to said frame and pivotally connected to said first member, two sets of friction surfaces arranged so that on relative movement between said two members relative movement must take place between the friction surfaces of at least one of such sets, means for loading the friction surfaces, those of one set offering greater resistance than those of the other, weighted means which are arranged to be displaced through their own inertia in a direction corresponding to the direction of travel of the vehicle on a sudden change of vehicle momentum taking place, and a connection between such weighted means and the friction surfaces which offer less resistance, so that on such displacement of the weighted means taking place, relative movement between these last mentioned friction surfaces is prevented and the friction surfaces offering greater resistance are brought into operation and the resistance to movement between the wheel and the frame is increased.

2. A frictional shock damper as claimed in claim 1, in combination with two surfaces, each of which is rigid with one of those friction surfaces which offer less resistance, and a cam, serving to establish a connection between said surfaces and said weighted means, when it is jammed between said two surfaces on displacement of said weighted means.

3. A frictional shock damper as claimed in claim 1, in which the weighted means has the form of a pendulum, the pivot end of which is formed as a cam, in combination with two surfaces, each of which is rigid with one of the friction surfaces offering less resistance, and is adapted to be gripped by said cam, when said cam is jammed between them on displacement of said pendulum.

IVAN ALEXANDER LESLIE.